United States Patent [19]
Carlson et al.

[11] 3,843,914
[45] Oct. 22, 1974

[54] DIGITAL SPEED CONTROL SYSTEM

[75] Inventors: Robert T. Carlson, Mound; Ralph E. Barr, Jr., Saint Paul, both of Minn.

[73] Assignee: Detection Sciences Inc., Minneapolis, Minn.

[22] Filed: Oct. 30, 1972

[21] Appl. No.: 302,296

[52] U.S. Cl. .............................. 318/327, 318/341
[51] Int. Cl. ........................................... H02p 5/16
[58] Field of Search ..................... 318/314, 318, 341

[56] References Cited
UNITED STATES PATENTS

| | | | |
|---|---|---|---|
| 3,400,317 | 9/1968 | Thomas | 318/314 |
| 3,495,152 | 2/1970 | Keiser | 318/314 |
| 3,582,550 | 6/1971 | Latanzi | 318/314 |
| 3,621,353 | 11/1971 | Matley | 318/314 |
| 3,638,089 | 1/1972 | Gabor | 318/318 |
| 3,646,417 | 2/1972 | Cassie | 318/318 |
| 3,724,720 | 4/1973 | Bullivant | 318/318 |

Primary Examiner—Robert K. Schaefer
Assistant Examiner—Thomas Langer
Attorney, Agent, or Firm—Merchant, Gould, Smith & Edell

[57] ABSTRACT

A digital motor speed control system employing a phase locked loop for generating a frequency proportional to the desired motor speed, which frequency is variable over a wide range in response to operator set-table digital switches. A signal comparison circuit provides control signals to the motor in response to the relationship between the frequency of the signals from the phase locked loop and the frequency of feedback signals from a speed sensor associated with the motor. The relationship between the frequencies of these two signals which is sensed by a signal comparison circuit, is itself a variable function determined by the programming of the comparison circuit. The comparison circuit is easily programmable for any given application of the speed controller so that the number set in the switches reads directly in terms of units of measure appropriate to the process to be driven by the motor.

5 Claims, 9 Drawing Figures

DIGITAL SPEED CONTROL SYSTEM

BACKGROUND OF THE INVENTION

The present invention pertains generally to the field of motor speed controllers, and more specifically to the field of digital motor speed controllers.

The advantages of digital control techniques have been recognized in the prior art for control applications in which a great amount of accuracy and flexibility is required. In particular, digital control systems using feedback principles have been very successfully applied to the control of the speed of a motor. The basic control concept involves generating a command signal having a frequency proportional to the desired motor speed, generating a feedback signal having a frequency proportional to the actual speed of the motor, comparing in some manner the two signals thus generated to provide control signals to the motor circuits which adjust the motor speed to the desired value. Numerous variations of this general concept exist in the prior art, wherein a wide variety of devices and circuits have been used to perform the individual signal generating and comparison functions.

Despite the great variety of prior art systems that have been proposed, several problems remain to be solved. One problem is the continuing need for greater degrees of accuracy and precision, in control systems of modest cost. Another problem is the need for a wide range of available speed control in some control applications. Many prior art speed controls which work reasonably well over a speed control range of 2 to 1 or so, are unworkable or inaccurate when speed control ranges of 15 to 1 or more are required.

A third problem involves the lack of easy adaptability of the prior art speed control systems to a variety of control applications. In the prior art, it has usually been necessary to design a digital speed control system specifically for a given application, requiring extensive redesign if the control is to be used on a different system. For example, if for a given application it is desired to control the speed of a motor in terms of revolutions per minute, then the speed control would have to be designed to give an appropriate scale factor so that the speed control adjustments which are set by an operator will read directly in terms of the use of speed to be used, namely rpm. However, in another application it may be desired to control a motor running a conveyor, and it may be necessary for the speed controller to be calibrated in terms of inches per minute of the conveyor. The relationship between the speed of the conveyor and the speed or the motor is determined by the characteristics of the motor and the drive transmission. If the prior art digital speed controller were used to control the conveyor motor, the speed setting set by the operator would not read directly in terms of the desired units of measure, namely inches per minute. Accordingly, it would be necessary to redesign and extensively modify the prior art speed control for each different application.

The present invention provides a digital speed control which overcomes these shortcomings of the prior art. According to the present invention, there is provided a digital speed control which has a high degree of precision through the use of a crystal controlled adjustable phase locked loop. Further, means are provided for maintaining the same high degree of precision and accuracy over a wide control range of 15 to 1 or more. Further, these features are combined in a speed control system which is readily programmable to read directly in terms of units of measure appropriate to a given application. Programming of the digital speed control according to the present invention is accomplished by the simple connection of the appropriate leads (usually numbering less than 12) to the inputs of a logic gate. The present invention thus allows a better speed controller to be produced at a lower cost because standard units can be produced in large volume, without the need for making changes in the production line. These standard units then can easily be programmed in the field for individual applications by making a few wiring connections.

SUMMARY OF THE INVENTION

According to the present invention there is provided a programmable digital speed control circuit for controlling the speed of a motor, including means for generating speed command signals, means for generating speed signals indicative of the speed of the motor, signal comparison means for producing control signals in response to the relationship between the speed command signals and the speed signals, and motor control means operable to control the speed of the motor in response to control signals from the signal comparison means. In a preferred embodiment, the means for generating speed command signals comprises a phase locked loop circuit whose frequency may be adjusted by operator settable speed set switches. The setting of these switches controls the frequency of the phase locked loop, and hence the operating speed of the motor. The signal comparison means is programmable in that the relationship between the frequencies of the two signals it senses is a variable function dependent upon the programming of the signal comparison means.

GENERAL DESCRIPTION OF THE PREFERRED EMBODIMENT

Figure 1:
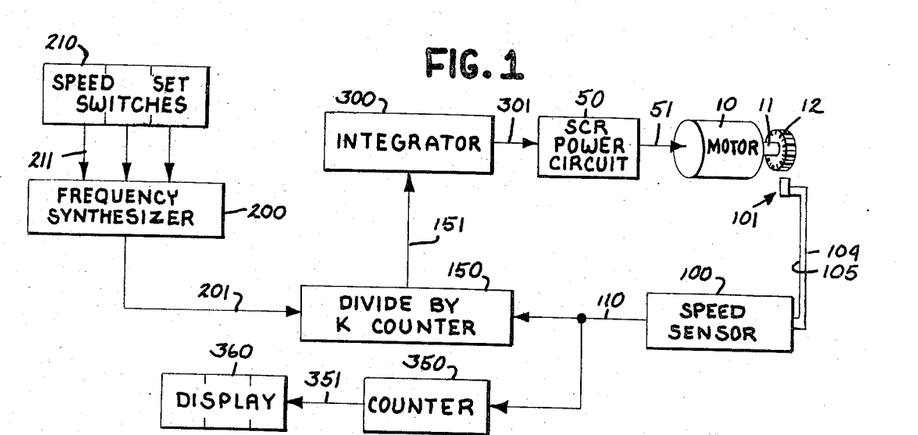
FIG. 1 is a block diagram of a digital speed control according to the present invention.

FIG. 1 shows a block diagram of a preferred embodiment of the digital speed controller according to the present invention. In FIG. 1, reference numeral 10 designates an electric motor whose speed is to be controlled. Motor 10 has a shaft 11 to which is attached a gear 12. Motor shaft 11 is also coupled through means, not shown, to the apparatus which is driven by the motor. Motor 10 is energized by power received on lead 51 from a silicon controlled rectifier (SCR) power circuit 50. The speed of the motor is controlled by the amount of power it receives from SCR power circuit 50, which in turn is controlled by signals generated by the rest of the control system.

A speed sensor 100 is provided for producing feedback signals indicative of the speed of the motor. A speed pickoff 101 is positioned near gear 12, and responds to the passage of gear teeth to produce signals proportional to the speed of rotation of the motor. These signals are shaped by wave shaping circuits in speed sensor 100 and are then applied as a train of speed pulses to lead 110. Thus, feedback signals indicative of the speed of the motor are provided in the form of a train of speed pulses having a frequency proportional to the speed of the motor.

The speed pulses generated by speed sensor 100 are used to perform two functions: (1) as speed feedback signals for use in the control system loop; and (2) to operate a readout device for giving a visual indication of the speed of the motor. This second function is performed by counter 350 and display 360. Speed signals from lead 110 are applied to the input of counter 350, which counts the speed pulses over a predetermined time interval. The number of pulses thus counted is applied through lead 351 to display 360, which visually presents the number. By proper choice of the time base for the counting interval of counter 350, the number displayed by display 360 can be made to read in terms appropriate to the machine or process being driven by motor 10. For example, the time base for counter 350 could be selected so that the display would read directly in revolutions per minute, inches per second, gallons per minute, or the like.

The other function performed by the speed pulses on lead 110 is to control the resetting of a divide by K counter 150 which counts pulses received on lead 201 from frequency synthesizer 200. Frequency synthesizer 200 receives inputs on leads 211 from a plurality of speed set switches 210. These switches may be binary coded decimal thumbwheel switches whereby an operator may dial in a number corresponding to a desired speed of the motor. The coded numbers from the switches are applied through leads 211 to the frequency synthesizer 200 which functions to generate speed command pulses at its output on lead 201 whose frequency is proportional to the speed command number set by switches 210.

Counter 150 is a divide by K counter, where K is a predetermined number programmed into the counter for a particular application of the speed control. Counter 150 functions during a first time interval to count pulses received from the frequency synthesizer until the number K is reached. During this first time interval, a first output signal is provided by counter 150 on lead 151. During a second time interval, which begins when the number K has been reached, a second output signal is provided on lead 151. This second time interval is ended by the receipt of a speed pulse from lead 110, which resets counter 150, initiating the repetition of the first time interval.

These first and second output signals are applied to integrator 300 by lead 151. The integrator responds to the relative durations of these two signals, and generates control signals for SCR power circuit 50. When the motor is operating exactly at the selected speed, the duration of the two output signals from counter 150 will be equal, and the correct speed will be maintained. Should a new speed be selected, or should the speed of the motor deviate from the selected speed, then the two output signals from counter 150 will be of unequal length, and integrator 399 will produce appropriate control signals causing the motor to return to the correct speed. The operation of counter 150 and integrator 300, which together comprise means for comparing the commanded speed and the measured speed, is described in greater detail in a subsequent paragraph, following a detailed description of the individual elements of the preferred embodiment.

DETAILED DESCRIPTION OF THE PREFERRED EMBODIMENT

The major components of the block diagram shown in FIG. 1 will now be individually explained.

Figure 3:
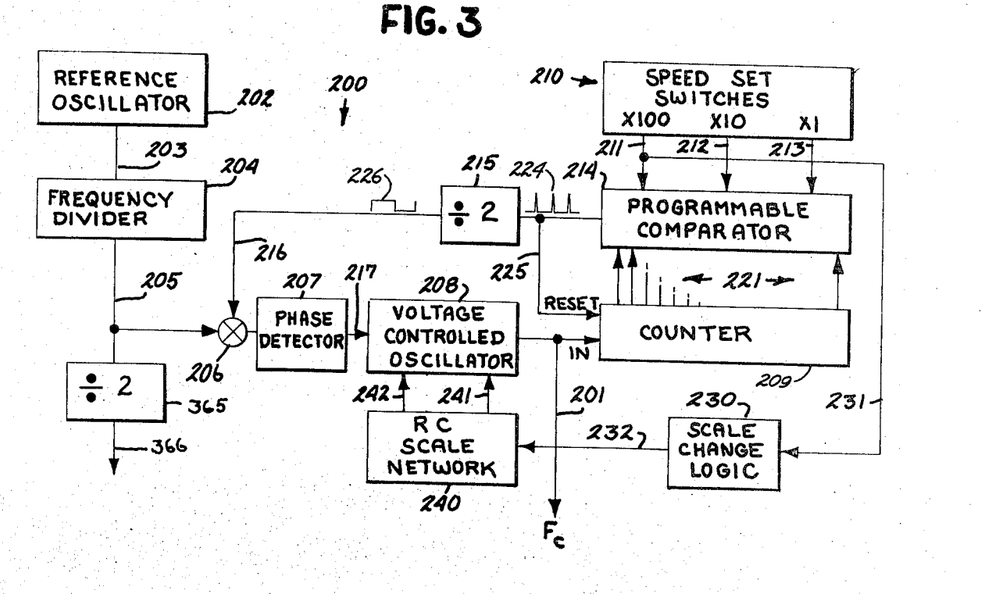
FIG. 3 is a block diagram of the phase locked loop frequency synthesizer used in the preferred embodiment of the invention.

Referring to FIG. 3, reference numeral 200 generally designates the frequency synthesizer, and reference numeral 210 generally designates the speed set switches. In FIG. 3, a reference oscillator 202 is provided for supplying reference signals to lead 203. In the preferred embodiment, reference oscillator 202 is a crystal controlled oscillator whose operating frequency is in the several megahertz range. Since the output frequency of frequency synthesizer 200 is derived from the reference frequency generated by reference oscillator 202, the accuracy and precision of the overall circuit depends upon the accuracy of the reference oscillator. The use of a crystal controlled oscillator is desirable because of its inherent stability.

The reference frequency on lead 203 is applied to a frequency divider 204, which comprises a chain of flip-flop circuits. The function of frequency divider 204 is to count down the reference frequency to a lower frequency which is more conveniently used by the rest of the frequency synthesizer. The exact frequency provided by frequency divider 204 may be designed so as to most conveniently adapt the digital speed control to the characteristics of the process which is to be controlled. In several useful embodiments, the output frequency of the divider is in the range of several hundred hertz. The output from frequency divider 204 is conveyed by lead 205 to a summing point 206, and also to a divide by two circuit 365 which has an output on lead 366 for use in the display circuit. Summing point 206 is the input to a phase locked loop which performs the frequency synthesizing function. The phase locked loop comprises a phase detector 207, a voltage control oscillator 208, and a feedback loop including a counter 209, and a divide circuit 215. The feedback frequency is fed to the summing point 206 on lead 216.

Phase detector 207 functions to compare the phase of the two incoming signals on leads 205 and 216, and to produce an error voltage at lead 217 which is indicative of the phase difference, if any, of the reference signal and the feedback signal. The error voltage is applied by lead 217 to the voltage controlled oscillator. The voltage controlled oscillator provides an output signal having a frequency $F_C$ which appears at lead 201. Signal $F_C$ is the output from frequency synthesizer 200, and is applied to counter 150 of FIG. 1. In FIG. 3, output frequency $F_C$ is also applied to the input of counter 209.

The output frequency $F_C$ is controlled by the speed switches 210 in the following manner. The output signal $F_C$ undergoes a frequency division in counter 209 and divider 215 before it is applied to summing point 206. Typically, the output frequency $F_C$ ranges in the neighborhood of several hundred kilohertz, but this frequency is divided down to several hundred hertz by the time it reaches 216, so as to exactly match the incoming reference signal on lead 205. If the feedback signal does not match the incoming signal, phase detector 207 will provide an error signal with sufficient magnitude to readjust voltage controlled oscillator 208 so as to provide whatever value of output frequency $F_C$ is required to satisfy the feedback condition, namely that the frequency at lead 216 equal the frequency at lead 205. Thus, by adjusting the amount of frequency division in the feedback loop, it is possible to control the output frequency.

Control of the amount of frequency division in the feedback loop of the phase lock loop is accomplished by programmable comparator 214. Comparator 214 is connected to receive speed command signals from speed set switches 210. In the embodiment shown in FIG. 3, the speed set switches comprise three decades: ones, tens, and hundreds. These switches are operator settable so that an operator may dial in a three digit number corresponding to a desired operating speed of the motor. Each switch provides a binary coded decimal output which is conveyed to comparator 214. FIG. 3 shows a single lead 211 conveying the number from the one hundred decade switch to comparator 214, but it will be understood that this drawing is merely symbolic, and that in reality four leads are required to convey a single binary coded decimal digit. Likewise, the ten decade and the one decade numbers are conveyed to comparator 214 by leads 212 and 213 respectively. Counter 209 comprises three decades of binary coded decimal counters. The plurality of leads 221 conveys the state of the various counter sections to comparator 214. Comparator 214 functions to provide a reset pulse 224 at its output on lead 225 when the count in counter 209 equals the number programmed on leads 211, 212 and 213. In other words, the output signal $F_C$ is counted by the counter 209. When the commanded number has been reached, comparator 214 provides a reset pulse which resets counter 209 and pulses the divide by two circuit 215. Thus counter 209 is reset and begins to count again. On the next reset pulse divide by two circuit 215 is again pulsed, and provides a square wave output 226 of half the frequency of the reset pulse 224. Square wave 226 is of the same frequency as the reference frequency at lead 205, against which it is matched at summing point 206. Thus, the phased lock loop provides an output frequency $F_C$ that is precisely controlled by the speed set switches. It will be appreciated that the stability and accuracy of the output frequency $F_C$ is exactly the same as the stability and accuracy of the reference signal provided by reference oscillator 202, since the phase lock loop will exactly track the input frequency.

In practice, it is convenient to use one of the commercially available phase locked loop circuit components which combines phase detector 207 and voltage controlled oscillator 208 on a single integrated circuit. In the use of this type of circuit, it is necessary to connect a resistance and a capacitance externally to the circuit. The value of the resistor determines the center operating frequency of the voltage controlled oscillator, while the value of the capacitor must be selected according to the value of the resistor in order to provide stability to the circuit. One drawback of the commercially available phase locked loop components is that typically they only provide for a maximum variation in output frequqncy of about 1.6 to 1. This limitation is not acceptable for use in digital speed control according to the present invention, because it is desired to have the capability of controlling the speed of the motor over a range of a minimum of 10 t0 1, and preferably a range of 15 to 1. This in turn requires the output frequency of the phase locked loop be capable of varying through the same range.

The necessary expansion in the range of operation of the phase locked loop is provided by RC scale network 240, and scale change logic 230. The output of the hundreds decade of speed set switches 210 is conveyed through leads 231 to scale change logic 230. Logic circuit 230 functions to respond to the most significant digit of the speed commanded by the operator, and provides output signals at lead 232 which causes RC scale network 240 to make adjustments in the values of the external resistors and capacitors connected to the integrated circuit containing the phase detector and voltage control oscillator.

Figure 4:
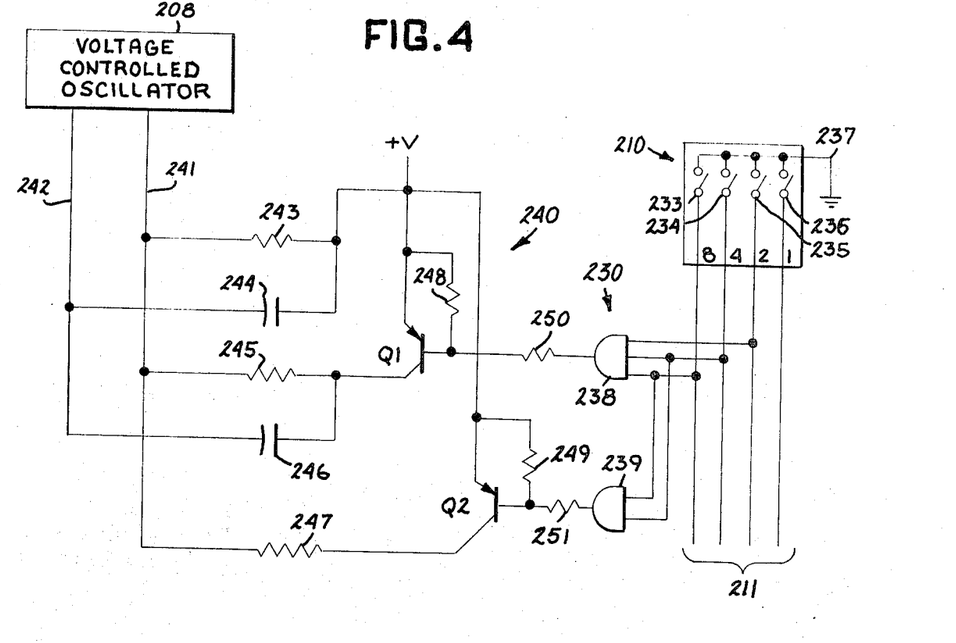
FIG. 4 is a schematic diagram of a range-expanding circuit for use with the phase locked loop of FIG. 3.

This circuit is shown in detail in FIG. 4. In FIG. 4, the hundreds decade of speed set switches 210 is shown having a plurality of switch contacts 233, 234, 235, and 236, which correspond respectively to the eight, four, two and one bits of the binary coded decimal output of the decade. All switch contacts have one terminal connected to ground through lead 237, while the other contacts communicate via leads 211 to the programmable comparator 214 of FIG. 3.

In FIG. 4, reference numeral 230 generally designates the scale change logic, which comprises AND gates 238 and 239. AND gate 238 has three inputs connected to the two bit, four bit and eight bit of the speed set switch. AND gate 239 has two inputs connected to the four bit and eight bit of the speed set switch.

Reference numeral 240 in FIG. 4 generally designates the RC scale network. Resistor 243 connects from a positive voltage source +V to voltage controlled oscillator 208 via lead 241. Similarly, capacitor 244 connects from the source of positive voltage to the voltage controlled oscillator 208 through lead 242. Resistor 245 connects from lead 241 to the collector of transistor Q1. Likewise, capacitor 246 connects from lead 242 to the collector of transistor Q1. A third resistor, designated by reference numeral 247 connects from lead 241 to the collector of transistor Q2. The emitters of transistors Q1 and Q2 are connected to the positive power supply. Additionally, the bases of transistors Q1 and Q2 are connected to the power supply through resistors 248 and 249, respectively. The output of AND gate 238 is connected to the base of transistor Q1 through resistor 250, and the output of AND gate 239 is similarly connected to the base of transistor Q2 through resistor 251.

When the setting of the hundred decade speed set switch 210 is either zero or one, none of switches 233, 234, nor 235 are closed. Consequently, all three inputs to AND gate 238, and both inputs to AND gate 239 are all high, or at a logical "1." Accordingly, the outputs of AND gates 238 and 239 will both be a high signal, and both transistors Q1 and Q2 will be cut off. With the two transistors cut off, resistors 245 and 247 and capacitor 246 are out of the circuit leaving only resistor 243 and capacitor 244 connected between the voltage supply +V and voltage controlled oscillator 208. Accordingly, for this setting of the speed command switch, the center operating frequency and stability of voltage controlled oscillator 208 are determined by resistor 243 and capacitor 244.

If the setting of switch 210 is either a "2" (2 bit) or "3" (2 bit and 1 bit), switch 235 will be closed, grounding one of the inputs to AND gate 238. However, the inputs to AND gate 239 at this time remain high. The low input to AND gate 238 causes its output to go to a logical zero, or ground, causing current to flow from the power supply +V through resistors 248 and 250, resulting in a voltage drop across resistor 248 placing the base of transistor Q1 less positive than its emitter. As a result, transistor Q1 is turned on, which effectively connects resistor 245 and capacitor 246 to +V, in parallel with resistor 243 and capacitor 244, respectively. The paralleling of the external resistor provides an adjusted center operating frequency for the voltage controlled oscillator which is commensurate with the increased frequency commanded by the speed set switch. The paralleling of the additional capacitor 246 provides the required stability at new operating point.

If the speed set switch 210 is now adjusted to any of the digits "4" through "9", then either switch contact 233 or 234 will be closed, grounding at least one input to AND gate 238, and also grounding one input to AND gate 239. In this state, Q1 remains in conduction as described in the preceding paragraph. Additionally, the output of AND gate 239 will be grounded, causing transistor Q2 to turn on. This effectively adds resistor 247 in parallel connection from the power supply +V to lead 241, thus further adjusting the center frequency of voltage controlled oscillator 208 to be commensurate with the new, higher, setting of speed set switch 210. If necessary for stability, an additional capacitor may be added from the collector of transistor Q2 to lead 242.

Figure 6:
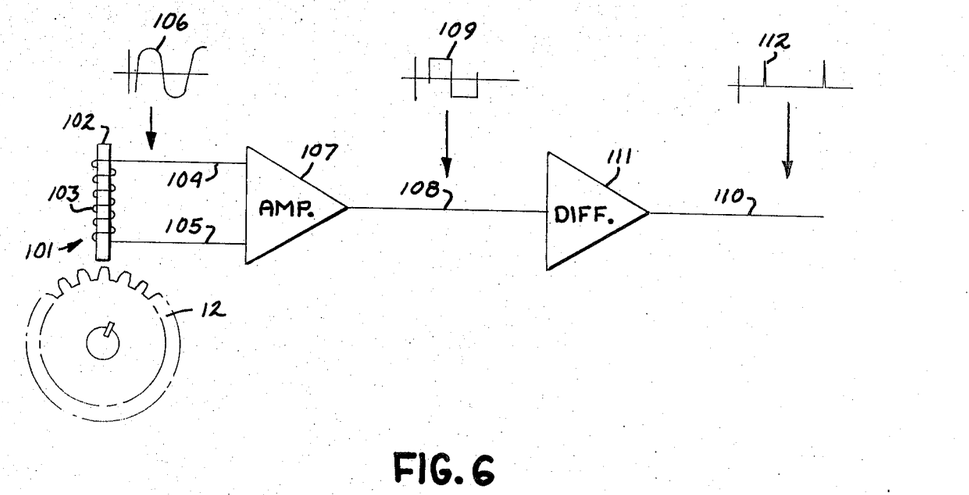
FIG. 6 is a block diagram of the speed sensor of FIG. 1.

The speed sensor 100 of FIG. 1 is shown in more detail in FIG. 6. Speed pickoff 101 comprises a Ferromagnetic core 102 surrounded by a pickoff coil 103, which is connected to the inputs of an amplifier 107 by leads 104 and 105. Core 102 is positioned close enough to gear 12 so that the passing of gear teeth as the gear rotates causes changes in the magnetic flux through the core. These magnetic flux changes induce a sinusoidal electrical signal in pickoff coil 103, as indicated in waveform 106. The frequency of these signals is equal to the number of gear teeth passages per second, which is proportional to the speed of rotation of the motor. Amplifier 107 is designed with sufficient gain so as to saturate due to the applied voltage. Accordingly, the output of amplifier 107 which appears at lead 108, is a square wave shown in waveform 109. This square wave is applied to the input of a differentiator circuit 111, which responds to the positive going edges of the square wave to produce very narrow pulses, or spikes, as shown in FIG. 112. These spikes are the speed pulses, which appear on lead 110 in FIG. 1, and which are shown in graph B of FIG. 8.

Figure 5:
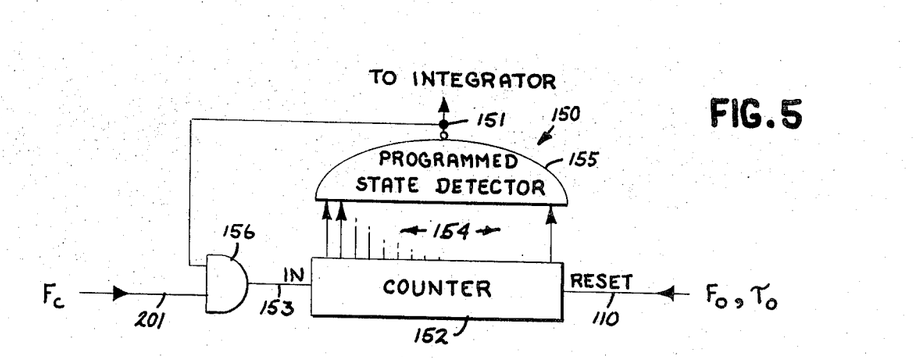
FIG. 5 is a block diagram of the divide by K counter of FIG. 1.

FIG. 5 shows the divide by K counter 150 of FIG. 1. In FIG. 5, the divide by K counter comprises a digital counter 152 having an input connected from lead 153, and a reset input which is connected to receive the speed pulses from lead 110. Counter 152 also has a plurality of outputs 154 which are connected to the outputs of various stages within the counter. A programmed state detector 155 receives leads 154, and provides an output at lead 151. This output signal is connected to integrator 300 as shown in FIG. 1, and also is fed back to AND gate 156 of FIG. 5. AND gate 156 receives as its input lead 201 which carries the speed command pulses from frequency synthesizer 200.

As previously discussed, divide by K counter 150 functions to provide an output signal 151 during the time it is counting up to the number K, then to change its output signal to ground, and hold until the next reset pulse from lead 110. The number K is a constant which is selected to be consistent with the requirements of the system whose speed is being controlled by the digital speed controller. Once the range of operation and appropriate scale factors for a given application are known, the value of K can be selected which is then programmed into the divide by K counter. Programming is accomplished by wiring outputs from the appropriate sections of counter 152 as inputs to programmed state detector 155, so that when the binary number in counter 152 reaches K, programmed state detector 155 will change output states. Programmed state detector 155 is in the nature of a NAND gate, and has a logical "1" output at lead 151 during the interval of time as counter 152 is counting. The logical "1" at lead 151 enables AND gate 156 so that the speed command pulses from the frequency synthesizer are applied to the input of counter 152. When the number K has been reached, all programmed leads 154 connected to state detector 155 reach a logical "1" state, causing the output at lead 151 to change to a logical "0". This logical "0" inhibits gate 156, so that the signals $F_C$ can no longer be applied to the input of counter 152. This state of affairs continues until the next speed pulse is received on lead 110, resetting counter 152. When counter 152 is reset, the number K no longer appears at inputs to state detector 155, and the output of lead 151 returns to a logical "1" state, thereby allowing the input pulses to return to counter 152 so as to repeat the cycle.

Figure 7:
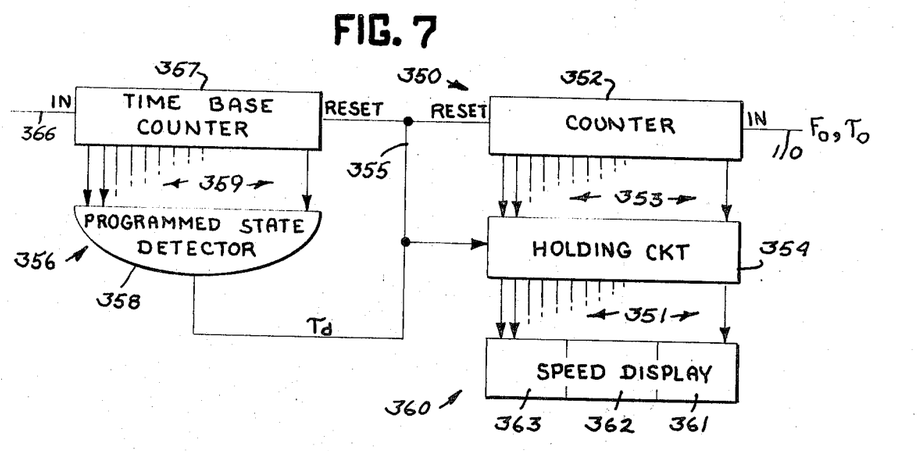
FIG. 7 is a detailed block diagram of the counter and speed display used in FIG. 1.

The counter 350 and speed display 360 of FIG. 1 are shown in more detail in FIG. 7. A counter 352 receives speed pulses at its input from lead 110. The speed pulses are counted in counter 352, and the number representing the count is applied through leads 353 to a holding circuit 354. The holding circuit comprises memory registers which will load and store the output of counter 352 when energized by the pulse on lead 355. Whatever number is being held in holding circuit 354 is applied through leads 351 to speed display 360. In the embodiment shown, speed display 360 comprises a ones decade 361, a tens decade 362, and a hundreds decade 363. The numbers supplied on leads 351 are converted from binary coded decimal form, and are displayed visually by speed display 360. The pulses on lead 355 which energize the holding circuit 354, are generated by a time base generator 356, and also serve to reset counter 352. Time base generator 356 comprises a time base counter 357 and a programmed state detector 358. Time base counter 357 receives reference pulses of constant predetermined frequency at its input from lead 366. For convenience, reference pulses from divide by two circuit 365 of FIG. 3 may be used by the time base counter 357 of FIG. 7, although another source of reference signals could be used if desired.

Time base counter 357 counts pulses received on lead 366. The number comprising the contents of counter 357 is applied to the inputs of programmed state detector 358 by a plurality of leads 359 which are connected to appropriate stages of counter 357, according to the time base that is desired.

When the preprogrammed number is reached, programmed state detector 358 provides a logical "1" at its output on lead 355, which resets holding circuit 354, and resets counters 352 and 357. The combination of counter 357 and programmed state detector 358 is similar in operation to the combination of counter 152 and detector 155 of FIG. 5. One difference is that while detector 155 of FIG. 5 is in the nature of a NAND gate, detector 358 of FIG. 7 is in the nature of an AND gate. Thus, the output of detector 358 is a logical "0" while counter 357 is counting, and is a logical "1" when the programmed number has been reached. Time base generator 356 thus functions to generate reset pulses having a period $\tau_d$ which is a function of the frequency of the reference pulses applied to the input of the counter 357, and the function of the porgramming of detector 358. Detector 358 is programmed according to the nature of the apparatus being driven by the motor 10 of FIG. 1, so that display 360 will read in the desired units such as revolutions per minute, inches per second, gallons per minute, or the like.

The speed pulses $F_0$ are counted by counter 352 during the interval $\tau_d$. At the end of the time period $\tau_d$, whatever number has been reached in counter 352 is transferred into holding circuit 354, for display by speed display 360. At the same time, counter 352 is reset to start counting speed pulses during the next interval $\tau_d$. The number in holding circuit 354 remains on display in speed display 360 until the next reset pulse.

Figure 2:
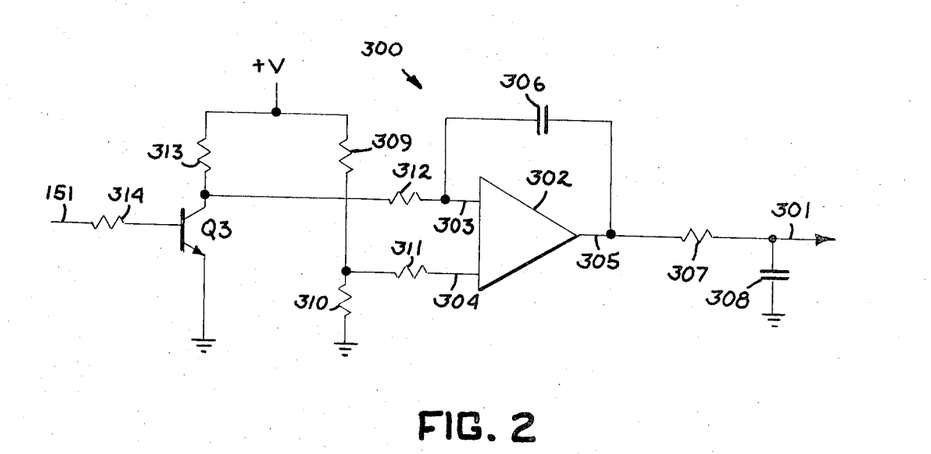
FIG. 2 is a schematic drawing of an integrator circuit used in FIG. 1.

Integrator 300 of FIG. 1 is shown in more detail in FIG. 2. A high gain operational amplifier 302 has inputs 303 and 304, and an output 305. A feedback capacitance 306 connects from the output to input 303. Also connected to output 305 is a resistor 307, which connects to lead 301. A capacitor 308 connects from lead 301 to ground. The inputs to operational amplifier 302 are provided as follows. Resistors 309 and 310 comprise a voltage divider connected between a positive voltage source +V, and signal ground. The voltage from the junction of resistors 309 and 310 is applied through resistors 311 as a reference voltage to input 304 of amplifier 302. The other input to the amplifier is supplied from the collector of a transistor Q3, as applied through resistor 312 to input 303. The emitter of transistor Q3 is connected to ground, and its collector is connected through resistor 313 to voltage source +V. The base of transistor Q3 is connected by resistor 314 to lead 151.

In operation, "0" and "1" logic signals from counter 150 of FIG. 1 are applied through lead 151 and resistor 314 to the base of transistor Q3 of FIG. 2. Transistor Q3 acts as a switch, conducting when a logical "1" is applied, and switching off when a logical "0" is applied. Accordingly, the input to amplifier 302 applied through resistor 312 is alternately connected to +V and to ground. When transistor Q3 is off, the voltage applied to resistor 312 is greater than the reference voltage applied to resistor 311, causing the output of amplifier 302 increase in a negative direction at a uniform rate. When transistor Q3 is on, the situation is reversed with the voltage applied to resistor 311 exceeding the voltage applied to resistor 312, which is at ground. The output voltage at output 305 then becomes less negative at the same uniform rate. The output signals from the integrator are filtered by resistor 307 and capacitor 308, for reasons which are explained in a subsequent paragraph.

OPERATION OF THE INVENTION

Figure 8:
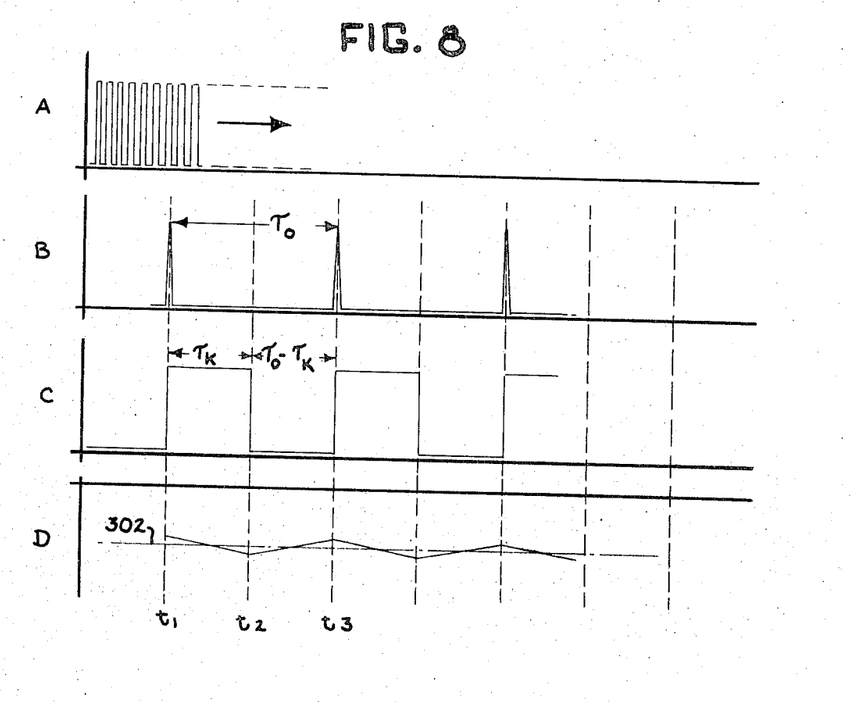
FIG. 8 is a graph of pertinent wave forms illustrating the operation of the invention.

FIGS. 8 and 9 show pertinent waveforms which illustrate the operation of the digital speed control system of the present invention. In FIG. 8, the horizontal axis represents time, and the vertical axes represent voltages for the various signals shown. In graph B of FIG. 8, there is shown the speed pulses developed by speed sensor 100, and applied to lead 110. These pulses have a frequency $F_0$ corresponding to the speed of the motor, and a period $\tau_0$, which is the interval of time between successive pulses. Graph A represents the waveform appearing on lead 201 at the output of the frequency synthesizer 200. The frequency of this signal is $F_C$, which is a variable dependent upon the setting of the speed command switches 210. The time scale of graph A is not the same as the time scale for waveforms B, C and D. In practice, $F_C$ is preferably several orders of magnitude greater than $F_0$, and the waveform of graph A is included merely to suggest the general relationship that the frequency of the pulses from the synthesizer is many times greater than the frequency of the speed pulses.

Graph C shows the waveform appearing on lead 151 at the output of counter 150. At time $t_0$, the output of counter 150 goes positive while the counter is counting input pulses. When the counter has filled up to the number K, which occurs at $t_0$ in FIG. 8, the output of the counter changes state to ground and remains there until the receipt of a speed pulse, which occurs at time $t_3$ and which resets the counter and starts the cycle again. The interval of time from $t_1$ to $t_2$ is labeled $\tau_k$, and equals the time required by counter 150 to reach the number K. The time interval from $t_2$ to $t_3$ is the difference between $\tau_0$ and $\tau_k$. The relative durations of the $\tau_k$ ON time of counter 150 and the $\tau_0 - \tau_k$ OFF time of the counter which are used to control the speed of the motor.

Referring to FIGS. 1 and 2, output pulses from counter 150 are applied to an integrator 300 through lead 151. Integrator 300 supplies control signals to SCR power circuit 50 through lead 301, in response to signals received from counter 150. In graph D of FIG. 8, there is shown a waveform corresponding to control voltages developed at output lead 301 by integrator 300, in response to the pulses of waveform C which are applied to the input of the integrator. During the interval of time from $t_1$ to $t_2$, the ON pulse causes the integrator output to increase in a negative direction at a uniform rate, corresponding to the negative time integral of the pulse in graph C. During the time interval from time $t_2$ to $t_3$, which is the OFF pulse of counter 150, the output of integrator 300 integrates in the opposite direction at the same rate. Thus, if the ON pulse $\tau_k$ of graph C is equal to the OFF pulse $\tau_0 - \tau_k$, then the average output of the integrator which is indicated by dashed lines 302 in graph D of FIG. 8 remains at a constant value. Although the output of integrator 300 comprises a series of straight line segments having alternating plus and minus slopes, the SCR power circuit does not respond to the individual line segments, but only to the value of the integrator output averaged over a number of such segments. This averaging effect is due in part to the inherently slow response of the motor to speed changes, as compared to the relatively fast plus or minus variations in the output of the integrator, and in part due to the filtering action of resistor 307 and capacitor 308 on the output of the integrator in FIG. 2. Also, it should be pointed out that the slope of the line segments in graph D of FIG. 8 has been exaggerated for purposes of illustration, and in practice the short term variations of the output of the integrator are very small compared to the average output indicated by line 302.

Capacitor 308 functions to ensure that the motor undergoes a "soft" start when the entire system is first energized. The term soft start refers to the condition wherein power is applied to the field coil of the motor before it is applied to the armature, resulting in smoother start up of the motor. When the speed control according to the present invention is first energized, power is applied to the field winding of the motor instantaneously, but the power applied to the armature which is controlled by the SCR power circuit is delayed due to the time required for capacitor 308 to charge.

Figure 9:
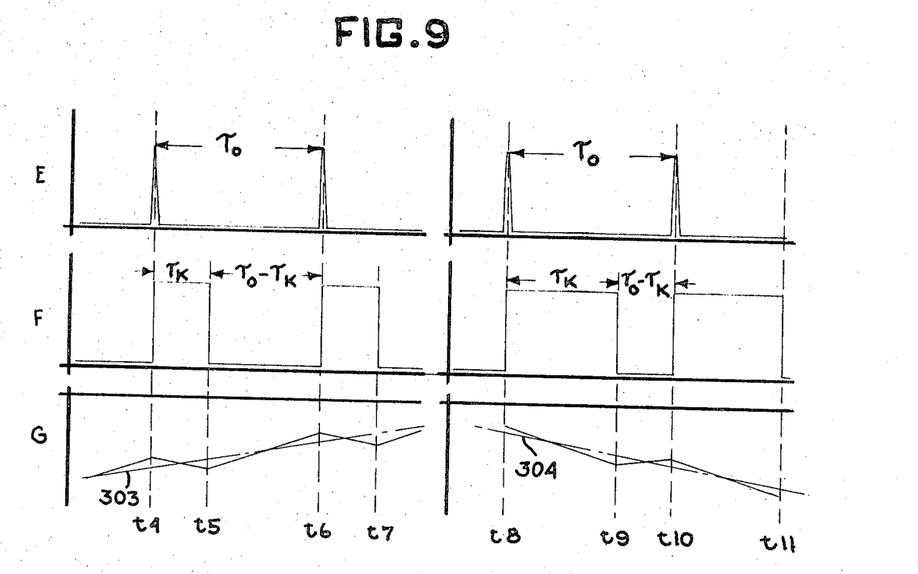
FIG. 9 is another graph further illustrating the operation of the present invention.

The ON and OFF pulses in graph C of FIG. 8 are of equal duration, indicating that the motor is operating at the commanded speed. The average value of the output from integrator 300 as indicated by waveform D remains constant, holding the motor on the correct speed. The waveforms in graph 9 illustrate situations in which the motor is not operating at the commanded speed. These situations could occur, for example, if the mechanical load driven by the motor were suddenly increased or decreased, or if the speed selected by the speed set switches were suddenly changed. In graph 9, waveform E shows the speed pulses, as in graph B of FIG. 8. Graph F of FIG. 9 shows the output of the divide by K counter 150, as in graph C of FIG. 8. However, in graph F the ON pulse $\tau_k$ which extends from time $t_4$ to $t_5$, is shorter than the OFF pulse, $\tau_0 - \tau_k$, which extends from time $t_5$ to $t_6$. This indicates that the motor is running slower than the commanded speed, because the counter fills up with input pulses to the number K in a relatively short time, then waits a relatively longer time for the next speed pulse to reset the counter. Accordingly, from time $t_4$ to time $t_5$ the output of the integrator as shown in graph G increases in a negative direction, then moves in a less negative direction from time $t_5$ to $t_6$. Since this latter interval of time is greater than the former, the net result is that the average value of the integrator output as indicated by line 303 moves in a positive direction. This increase in the integrator output causes the SCR power circuit to increase the firing angle through which it conducts, thereby delivering a larger amount of power to the motor so as to increase its speed.

The opposite condition is shown from time $t_7$ through $t_{11}$. During this time the motor is going too fast as indicated by the fact that the ON pulse, $\tau_k$ is greater than the OFF pulse, $\tau_0 - \tau_k$. From time $t_8$ to $t_9$, counter 150 counts input pulses up to the number K, then changes its output at $t_9$. However, because the motor is going too fast, the next speed pulse which occurs at time $t_{10}$ resets the counter before an OFF time equal to the ON time has occurred. The average value of the integrator output in graph G from time $t_8$ through time $t_{11}$ is shown by line 304. The average output value during this time interval exhibits a net negative trend, reflecting the unequal values of the ON and OFF pulses. The increasingly negative integrator output causes the SCR power circuit to reduce the amount of power delivered to the motor, thereby reducing its speed.

As previously mentioned, a principal feature of the present invention is its great flexibility which allows it to be easily adapted for different applications. The speed control system can be quickly and simply programmed for any given control application, so that the numbers set by the operator on the speed set switches and the number appearing on the speed display both read directly in units of measure appropriate to the particular control application. There are only two program points in the speed control system, namely programmed state detector 155 of FIG. 5 in the divide by K counter, and programmed state detector 358 of FIG. 7, in the speed display. Once certain characteristics of the process which is to be controlled are known, the required program numbers for the two programmed state detectors can be readily calculated.

This programming flexibility is illustrated by the following example. Assume for purposes of illustration that it is desired to control the speed of the motor which drives a conveyor belt or the like by means of a suitable transmission. Assume further that it is desired to vary the speed of the conveyor over a range of from 5 inches per minute to 75 inches per minute. Assume also that it is found that the gear reduction in the transmission results in the following relationship:

445.2 rpm (motor) = 70.0 inches/minute (conveyor)

The speed pick-off 101 of FIG. 1 is positioned near an 18-tooth sprocket on the motor.

The determination of the display program number is as follows: At 70.0 inches/minute, a displayed value of 70.0 is required. This requires a count of 700 in counter 352 (FIG. 7) at the time the count is transferred to the speed display, the speed display having an appropriate decimal point so that the 700 count reads as 70.0.

The frequency of the speed pulses $F_0$ at a speed of 70.0 inches/minute is $F_0$ = 445.20 rpm/60 · 18 teeth = 133.56 $H_z$ In one preferred embodiment, the crystal control reference oscillator 202 of FIG. 3 has a frequency of 3.57 $MH_z$. Frequency divider 204 has an overall division of 10,240 (made up of the cascade of a divide by 10 counter, two divide by 16 counters, and a divide by 4 counter) giving a reference frequency at lead 205 of 349.54 $H_z$. This frequency is further divided by two by divider 365 which gives a reference frequency of 174.77 $H_z$ to lead 366 of FIG. 7.

Counter 352 of FIG. 7 requires

No. of counts/$F_0$ = 700/133.56 seconds to reach a count of 700. During this interval of time, counter 357 will have reached a count of 700/133.56 seconds · 174.77 $H_z$ = 915.9 counts ≅
916 converting from base 10 to 2,
$916_{10} = 1624_8 = 1110010100_2$ The programming technique is to tie the outputs of those sections of counter 357 which are logical 1's for the program number to the inputs of programmed state detector 358. Thus, if the sections of time base counter 357 are designated A through L, with A being the least significant bit and L being the most significant bit:

counter section L K J I H G F E D C B A
program number 0 0 1 1 1 0 0 1 0 1 0 0 then the outputs of sections C, E, H, I, and J should be connected to the programmed state detector.

The calculation of the program number for the divide by K counter is as follows: At a setting of speed set switches 210 of 70.0 inches per minute, the speed command frequency $F_C$ from the frequency synthesizer of FIG. 3 will be $F_C = 2 \cdot$ Reference frequency $\cdot$ Set number $\cdot$ 10
$= (2) (349.54) (700)$
$= 489.356$ KHz, the factor of 10 being due to a decimal on the control panel so that a setting of 70.0 actually applies the number 700 to the phase locked loop.

The program number is the number of counts of counter 152 (FIG. 4) which will occur in half of the period of the speed pulses.

program number $= \tau_0/2 \cdot F_C = F_C/2 \cdot F_0 = 489.356$ KHz$/(2) (133.56$Hz$) = 1830.4 = 1830$ converting from base 10 to base 2: $1830_{10} = 3446_8 = 11100100110_2$ If the successive sections of counter 152 are designated A through L, with A being the least significant bit and L being the most significant bit:

counter section L K J I H G F E D C B A
program number 0 1 1 1 0 0 1 0 0 1 1 0$_2$ then the outputs of sections B, C, F, I, J, and K should be tied into programmed state detector 155.

Thus by programming the two program points, the digital speed control system according to the present invention can easily be adapted to read directly in units of speed appropriate to the process or machine which is to be controlled.

I claim:

1. A programmable digital speed control system for controlling the speed of a motor, comprising:
   a. adjustable means for receiving a speed command number and for providing speed command signals in response thereto having a frequency indicative of a desired motor speed;
   b. means associated with said motor for providing speed pulses, the period between pulses being inversely proportional to the speed of the motor;
   c. programmed counter means connected to receive said speed command signals and said speed pulses, said programmed counter means operable in a first state initiated by receipt of a speed pulse to count said speed command signals, and operable in a second state initiated by reaching a predetermined count to cease counting until receipt of the next speed pulse; and
   d. a motor control circuit including integrating means connected to said programmed counter for integrating in one direction tending to decelerate the motor when said programmed counter is in said first state, and for integrating in the opposite direction tending to accelerate the motor when said programmed counter is in said second state, whereby the speed of the motor is caused to be adjusted so that the period of time between the reaching of the predetermined count and the next speed pulse is made to equal the period of time required for the programmed counter to count the predetermined number of pulses.

2. Apparatus according to claim 1, wherein said programmed counter means comprises:
   a. a counter;
   b. a gate connected for selectively applying said speed command signals to said counter;
   c. means for resetting said counter in response to a speed pulse; and
   d. a detector connected to said gate and connected to said counter according to a predetermined program number, said detector operable when the count in said counter is less than the program number to enable said gate to permit said counter to count speed command impulses, said detector further operable when the count in said counter reaches said program number to inhibit said gate, until the counter is reset by the next speed pulse.

3. Apparatus according to claim 2, wherein said integrating means is connected to the output of said detector.

4. Apparatus according to claim 2, wherein said counter includes a plurality of binary stages, and wherein said detector has a plurality of inputs which are selectively connectable to stages of said counter according to said program number.

5. Apparatus according to claim 4, wherein said detector comprises a NOR gate.

* * * * *